(12) United States Patent
Hajmiragha (10) Patent No.: US 6,289,460 B1
(45) Date of Patent: Sep. 11, 2001

(54) DOCUMENT MANAGEMENT SYSTEM

(75) Inventor: Mir Hajmiragha, Bellevue, WA (US)

(73) Assignee: Astus Corporation, Seattle, WA (US)

( * ) Notice: Subject to any disclaimer, the term of this patent is extended or adjusted under 35 U.S.C. 154(b) by 0 days.

(21) Appl. No.: 09/455,266

(22) Filed: Dec. 6, 1999

Related U.S. Application Data (60) Provisional application No. 60/153,583, filed on Sep. 13, 1999.

(51) Int. Cl.[7] .................................................. G06F 17/30
(52) U.S. Cl. .......................... 713/200; 707/103; 707/10; 705/53; 700/83
(58) Field of Search ............................ 713/200; 705/103; 707/83, 53, 54, 9; 700/83

(56) References Cited

U.S. PATENT DOCUMENTS

| | | | |
|---|---|---|---|
| 5,813,009 | * 9/1998 | Johnson et al. | 707/100 |
| 5,832,499 | * 11/1998 | Gustman | 707/103 |
| 6,092,080 | * 7/2000 | Gustman | 707/103 |

* cited by examiner

*Primary Examiner*—Ly V. Hua
(74) *Attorney, Agent, or Firm*—Black Lowe & Graham PLLC (57) ABSTRACT

A system for allowing predesignated users at remotely located computer-based systems to perform document management. Components of the system include public data network, a publication facility, a remote storage facility and a document manager computer-based system. The document manager computer-based system, the publication facility, the remote storage facility are all coupled to the computer-based systems used by the predesignated users over the public data network. The system allows authorized users from remote locations to perform secure document collaboration, share and archive documents, context index documents, digitally notarize documents, electronically file documents and publish documents.

20 Claims, 2 Drawing Sheets

Fig. 1

DOCUMENT MANAGEMENT SYSTEM

PRIORITY CLAIM

This application claims priority from U.S. Provisional Application Ser. No. 60/153,583 Sep. 13, 1999.

FIELD OF THE INVENTION

The present invention relates to an electronic document management system and more particularly to a system that provides a full service document management system.

BACKGROUND OF THE INVENTION

The business world today is deluged by a tremendous amount of paperwork that is generated and used on a daily basis. For example, during the course of a typical court case tens of thousands of documents may be produced. Storing, managing, and retrieving information in this mountain of paper is time-consuming and costly. Worse yet, documents may be mis-filed or lost in the "system". Organizations may spend thousands of dollars attempting to organize this paper in a logical way, yet still find themselves unable to find important documents when necessary.

Even if a database of documents is well organized, it may be difficult to access years later. For example, once a lawsuit has concluded, documents are typically boxed and stored in a long-term storage facility. Such a process makes it exceedingly difficult to use the stored documents in a later case, even if they are well-organized and indexed. Consequently, the knowledge that once resided in the collection of documents may effectively be lost and never recovered.

Present records management systems, particularly those that manage documents in paper form, are also expensive, particularly if they are organized well enough to be accessed easily. The cost of this organization and management is passed directly to the public in the form of higher consumer prices.

Beyond the records management problems, document authentication presents additional problems. A considerable amount of time and money is spent supporting a notarization system that requires one to be physically present before a notary to sign a document or approve a statement.

Some companies are working on systems that are intended to alleviate one or more of these burdens. For example, electronic court filing software products, such as JusticeLink and WestFile, focus on the court-specific case management and electronic filing acceptance capabilities. They are unconcerned with files generated by users. JusticeLink offers electronic filing and subsequent sharing of filed documentation, but fails to offer content indexing, access to documents not filed with the court, publication, notarization, or other capabilities. WestFile allows indexing of documents that were electronically filed using the WestFile system, but it is therefore directed only at documents of public record.

Other systems, such as BackJack and Evault, attempt to provide network archiving. These solutions fail to offer customers a number of crucial services, such as content indexing, shared access, access auditing and control, digital signature, publication, or electronic filing. Consequently, they fall short of what could be considered an effective document management system.

Document management companies, such as Xerox, offer products geared towards internal document management. Their document management software allows a group of Intranet, and possibly Extranet, users to check-in and check-out documents while tracking changes. Their solution attempts to provide an internal document processing and control system for a single enterprise. Some of these companies offer an Intranet solution for internal company document management. This is often an extension of a network client/server based computing system as enterprise customers start using Intranet as the medium to share and use their resources. Since these companies require secure authentication by a user, the system cannot be used by those external to the system and thus document collaboration is only accomplished internally.

Legal Anywhere Collaborator 4.0 and Legal NetEx are still other software tools designed for the legal industry. Legal Anywhere Collaborator 4.0 is an Intranet/Extranet based tool designed specifically for attorneys and their clients to collaborate on document development related to a matter. Legal Anywhere includes features such as long term use, off-line operation, archiving, as well as development hosting and programming. Legal NetEx enables users to electronically send, receive, collaborate, file and store documents via the Internet with password security. Encryption is also available with Legal NetEx. But Legal NetEx fails to provide document archiving, electronic notarization, electronic filing and remote publication.

As is shown above, currently-available systems attempt to provide specific business applications over a network, but are unconcerned with providing an integrated service system. Thus, there exists a need for an easily accessible document management tool with facilities for content indexing, shared document accessing, access auditing, digital signature, publication and electronic filing.

SUMMARY OF THE INVENTION

The present invention is a document management system that provides secure document collaboration, sharing and archiving with context indexing, digital document notarization, electronic document filing and document publication.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

The present invention provides secure document management and access across the Internet, with online notarization, content indexing, remote secure document archiving, function auditing and selective publication of documents in a specified medium.

Figure 1:
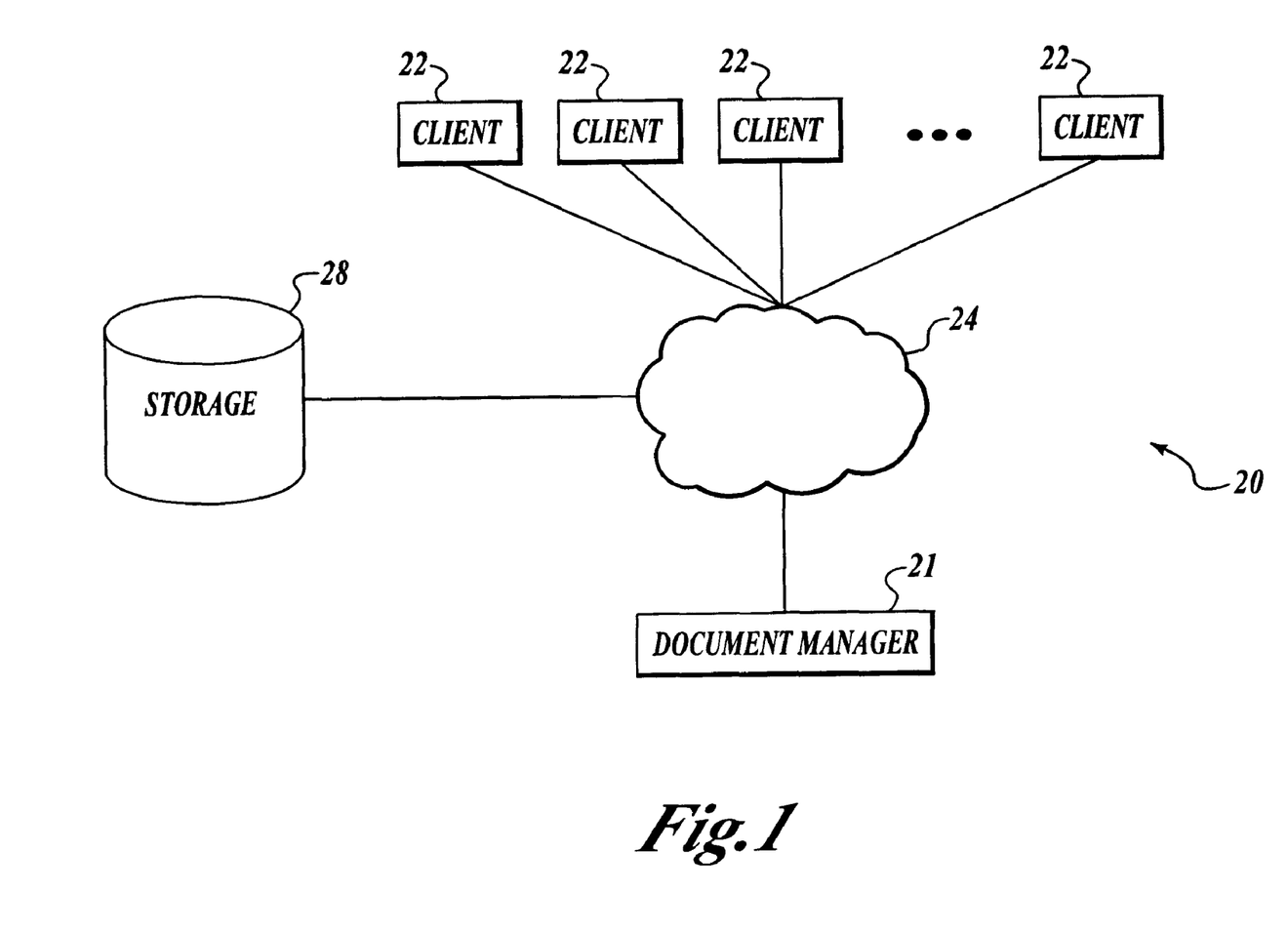
FIGS. 1 and 2 are block diagrams illustrating the components of the present invention.

FIG. 1 illustrates a document management system 20 that is a computer-based, network system. The document management system 20 includes a document manager 21 coupled to a plurality of clients 22 and remote storage 28 over a public or private network 24. The document manager 21 includes components for performing remote document archiving, document collaboration, secure document access, audited document access, digital document signing, document content indexing, document publication and an external document storage for the coupled clients 22. These components are described in more detail below with respect to FIG. 2.

Figure 2:
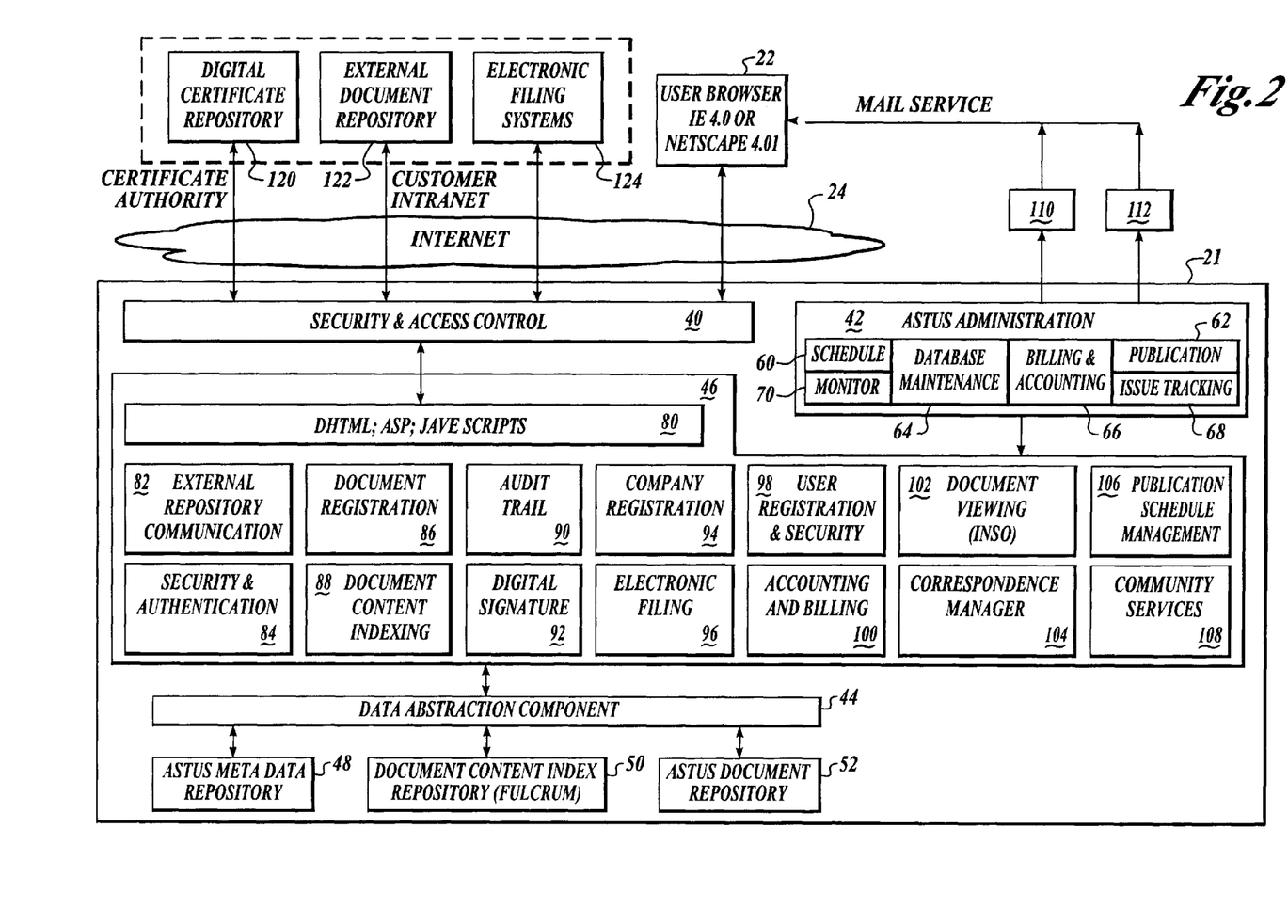

FIG. 2 illustrates the system or software components of the coupled systems shown in FIG. 1. The document manager 21 includes a security and access control component 40, a system administrator 42 and a data abstraction component 44, all of which are coupled to an application program 46. Coupled to the abstraction component 44 are data repositories 48–52.

The system administrator 42 includes a scheduler component 60, a publication component 62, a database maintenance component 64, a billing and accounting component 66, an issue tracking component 68, and a monitor component 70. The application program 46 includes a scripts component 80, an external repository communication component 82, an authentication component 84, a document registration component 86, a document content indexing component 88, an audit trail component 90, a digital signature component 92, a company registration component 94, an electronic filing component 96, a user registration and security component 98, an accounting and billing component 100, a document viewing component 102, a correspondence manager 104, a publication schedule manager 106, and a community services component 108. Coupled to the system administrator 42 are output devices, such as a printer 110 and a compact disc generator 112.

In one embodiment, the remote storage 28 includes multiple distributed remotely located storage components, such as a digital certificate repository 120, a document repository 122, or an electronic filing system 124.

The billing processes are performed according to the user's account billing preferences during the document transaction. Each user has one or more billing accounts, which are active at the time of a transaction. The active billing account is debited as a result of a transaction confirmation by the user, where the billing account is clearly stated.

Each user selects a billing account as the default account to be used as part of the document transaction billing. Each user billing account related to a company has general billing information, such as where the company will receive the invoices. Additionally, each user has the opportunity to enter personal credit card information to be used as part of monthly billing, thus allowing a user to maintain the same log-on account to receive and archive personal and business oriented documents while separating the billing responsibility.

Each company has the option of customizing its invoice generation format. Companies can specify three levels of grouping for each invoice and specify the receiving format, such as spreadsheet or paper. Additional detail levels on the invoice can also be defined.

Invoicing is performed on a periodic basis, such as bimonthly, and is 30 accessible on-line. Additional detail for each invoice is accessible by the user.

The user registration and security component 98 provides user authentication. User authentication is based upon a minimum of a single password and a challenge/response process. The user registration and security component 98 provides user accessible pages over the network 24. In a first page the user is asked to select minimum of a single password, and an optional second password for access to the system. The user registration and security component 98 allows user access to the functions of the document manager 21 based on the user provided password combinations and alias. If, during user account access, there are three fail attempts to access an account using the alias and password (s) combination, the user registration and security component 98 locks the account and forces the user to use a personalized Challenge/Response process to unlock the account. With respect to the Challenge/Response process, one or more personal challenge questions and responses are required by the user to complete the registration process. The user receives an e-mail containing the password upon successful response to the Challenge/Response process. All user interaction with the system is logged and audited for future security audits. Authenticated users are permitted to perform activities defined during their registration process and dictated by an Access Control List.

Also, the user registration and security component 98 provides user interface (UI) windows that allow a user to modify passwords and other security information. After a user has been authenticated by entering the original password, a new password and confirmation of new password are required to change the user's password. If a user previously entered two passwords for authentication, both passwords are requested for changing of the passwords. The UI also provides a delete button that will cancel the user's secondary password when selected.

The user registration and security component 98 provides another UI for allowing change of authentication challenges in the Challenge/Response process. A new challenge and response are made by entering the new challenge, the response and a response confirmation. The change of authentication challenges UI also provides a delete button that will cancel the user's secondary challenge when selected. Still another UI allows an authenticated user to access and change its credit card information.

Before a user becomes a signatory for digitally signing documents, the digital signature component 92 provides one or more UI pages that allow a user to execute a digital certificate. Users print, sign and return a notarized version of a registration page provided by the digital signature component 92. Upon receipt and verification of the notarized page by the digital signature component 92, the digital signature component 92 issues the user a secure e-mail containing a personal identification number (PIN) and a live link to a secure page (WEB site) that allows the user to retrieve the digital certificate.

The security and authentication component 84 provides secure user communication with other users of the system. Systems that use a secure socket layer communication over the Internet require a private and a public key pair. The private key is solely used by the owner to encrypt messages. The public key on the other hand is published to other users for decryption purposes only. With the private key the user encrypts a message that is then decrypted by its public counter part. The digital certificate passes the user's public key to desired users in order to establish a direct trusted communication between the users. The digital certificates are not used to sign a document. Digital certificates are sent to users to publish a user's public key to verify the user's digital signature. Digital certificates are stored in the remotely located digital certificate repository 120 and are periodically renewed and revoked as is deemed necessary.

The electronic filing component 96 allows users to electronically archive files or documents with a user-specified retention period. The document content indexing component 88, upon user request, automatically indexes documents to be archived by the electronic filing component 96. For example, one form of electronically filing is facsimile transmission of documents. Another form is to file the document electronically with an EDI-based system, such as that used by the Federal Bankruptcy Court.

The document registration component 86 enables users to share an archived document with other interested parties while maintaining security and control. Through document registration component UI pages, users allow other interested parties access to read-only archived documents for review and comments. For example, a lawyer who has produced a document, e.g. a will and testament or a court brief, shares it with other users who have access to the Internet, e.g. the client or other trial parties. The audit trail component 90 provides auditing of user accesses to archived documents. Each access by any user is recorded and the access history is viewable by the document's author. Additional indexing and grouping capabilities are also available to all parties that have accessed the system.

In an example scenario, a user remotely logs into the document manager 21 and is presented with a number of documents that have been assigned, by the document's author, to him or her for review. Upon accessing and reviewing each document an audit record is produced recording time and level of access.

The correspondence manager 104 provides UIs that allow users to customize the document management processes to fit their operational environment. The correspondence manager 104 includes process flow templates that generate conditional Access Control List records that enable discretionary access to files for each designated user. For example, a template defines all clients that should review and sign a document before the opposing counsel is able to review the document. Process flow is defined in three inter-related types:

Community Level—a set of templates used by all organizations;

Company Level—a set of flow process templates used throughout a company as defined by a company administrator;

User Level—a user defines a set of personal templates to be used during document archiving.

The following is example of multiple user collaboration of a document performed in accordance with the present invention. A collaboration document is checked in by the author for collaboration and specifically assigned to a group of people for collaboration. Then, the document is checked out by each person in the assigned group and each modification is tracked by the respective word processing document, such as MS WORD™ or WORDPerfect™. Each version of the document is saved for auditing purposes. User or group member comments about a document are recorded using a correspondence feature. Each person's comments are identified and annotated. Users are allowed to specify and assign a legally binding electronic signature to a document or a file, provided they have a signature previously registered in the document management system. For example, a lawyer sends a deposition to the document management system and requests a signature by a client. The signator, having a registered signature in the document management system, can then log on to our system, through the Internet, and sign the document electronically. An electronically signed document provides privacy and legal legitimacy.

The publication schedule manager 106 allows for document publication in a number of different mediums. Document publication is the process by which a user extracts a copy of the document. The publication schedule manager 106 first provides a confirmation user interface screen. The confirmation user interface screen provides the user with a choice of a number of different file formats. Then, the user appoints a target directory for the file. Next, the user indicates file information, action and billing information through the confirmation UI screen. The document is downloadable in the document's original format and the HTML format. For example, if the user has selected the HTML format, the user is shown the document in the HTML format and then indicates file information, action and billing information through a presented confirmation screen.

Once the user has selected a set of files in the HTML or original format, a scheduling event is generated by the publication schedule manager 106. The scheduling event is either generation of compact disc (CD) or a paper copy. The CD's content is indexed if desired and a custom interface is provided that allows access to the CD's contents using a browser-based interface. Content indexing allows users to have access to the content indexed documents when offline. For example, a CD allows a lawyer to view and scan case documents during a trial. Additional copies can also be sent to the trial judge and other interested parties.

Still within the publication schedule manager generated UI's, the user provides a shipping address for the CD or paper publication. The user receives a completion status of the publication activity upon shipment.

Another scheduling event is transmission of a file to an external system. The designated external system must be registered with the document management system. The user specifies its community and/or company and the receiving system's information requirements. The user receives a completion status of the activity upon execution.

The following is an illustrative example of a process of a user interacting with the present invention described above in FIG. 2. General user information is provided as part of the user log-in process. This information includes data related to the personalized viewing of documents, such as intelligent folders (described below), and default filters applied for narrowing the displayed document list.

After a user signs onto the document management system, as provided by a document manager provided UI that is accessed from the user's system 22 over the network 24, a to-do list is displayed to the user. The to-do list is a list of documents for which the user must perform an action. The following are the preferred document action categories in the to-do list:

Review,

Signature,

Approval,

Collaboration.

Each item in the list has a direct link to the document viewing page to perform the desired action. Users can customize their document viewing. The document manager 21 provides an interface grouping of documents accessible by the user. The to-do list is dynamically generated whenever the user clicks on a displayed TO-DO list UI button. User selection of an item in the to-do list displays the corresponding document list and the required action associated with that document. Each user has previously assigned account level permissions enabling the user to Archive, Review, Collaborate, or Publish, the documents, as required.

There are four types of documents that are managed by the document manager 22: archived, collaborated, external, and templates. An archived document is read-only, not modifiable, and indexed. It is accessed directly, given the appropriate access rights, via the TO-DO list. No action taken by the user has any effect on the content of the document. An archived document is scanned for possible virus infection and the user is asked if they want to continue or not in case of a virus detection. A virus infected document is not indexed, is not viewable, and any user accessing it will be warned as to the possibility of the infection.

A collaborative document is modifiable by a selected few through a check-in and out process, and the document's content is not indexed. A collaborative document is scanned for possible virus infection and is not allowed to be registered and checked-in in the event of a virus detection. A collaborative document can be archived by the owner upon finalization of the collaborative activities.

An external document is a document not residing with the document manager 21. The external document is indexed once and access to the external document is managed by the document manager 21 using the Assess Control List facilities. A copy of the document is temporarily copied to the document manager 21 during the content indexing process and deleted upon the process completion. The content of an external document is not guaranteed to change, since it is not managed by the document manager 21. Additionally, access speed to documents externally stored in a repository is highly dependent upon the document repository's speed.

A template document is a read-only document with various levels of access. Personal template documents are allowed through archival registration processes. Any user affiliated to a community or company can have access to the templates. A template document can only be accessed through its original format. A template document is scanned for possible virus infection and is not allowed to be registered in the event a virus is found. Community templates are registered by the document manager 21. Personnel and company templates are registered by the company's administrator.

A set of process flow templates are used during the Access Control List definition process. DFM defines a set of generic conditional rules specific to a document type. As mentioned before this process can have three level of usage by the user: community level; company level, and user level. DFM templates generate a series of Access Control List records that are activated conditionally based upon the requested task, responsibility and completion. Each responsibility is also accompanied with a requested deadline. For example, John Smith is requested to review, or sign, a given document by a specific date. Each registered user requested to perform an action against a document is informed of the request by an e-mail containing the request and a link to the document's location. Additionally, any users not fully registered in the system, such as contacts, receive temporary passwords enabling them to log-in to the document manager 21 and complete the secure information phase of their registration process prior to seeing any documents. During Access Control List definition, a document acquires the following attributes:

Users allowed access to the document,

Activity requested of the users,

Requested activity completion date,

Permissible number of requested activities by the user, to contain cost.

For example, the following statement could be created by translating these attributes to common English: John Smith should review this document by Jan. 1, 1999 no more than 3 times.

The document manager 21 provides folders for groups of documents and the roles that a predefined user will play with respect to the folders. The document manager 21 establishes a folder name, users associated with the folder and their roles. For example, case 1234 has John Smith and Joe Brown as clients, Betty Moore as opposing counsel, Kevin James as the counsel, and James West as legal associate.

The document manager 21 establishes default archival rules for a given folder. A Folder Access Control List template is created which can be used for fast document archiving, thus answering any attribute requirements for any type of documents. For example, all depositions in case 1234 will be reviewed by John Smith for a maximum of 3 times and are due 4 days after archiving.

Intelligent folders are graphical UIs that allow a user to group documents and manage their access in a personalized fashion. Each item in the intelligent folder has an inherited intelligence from the documents specific to a user. Intelligent folders are organized by community cabinets (e.g. Legal, Banking, Real Estate), and activity drawer (e.g. Archive, Review, Sign). Cabinets and drawers are dynamically created by the user's document Access Control List. For example, if a user is assigned to review a document by a bank, the banking cabinet will become visible to the user with a number of documents needing the user's attention in parenthesis. Conversely, the review drawer will become visible under banking with number of documents to be reviewed in parenthesis. Intelligent folders become visible upon selection of a drawer, i.e. when the user clicks on or in some way activates the drawer. Intelligent folders are dynamically reconfigured by the user and can be saved as personalized views for future use. Additionally, like cabinets and drawers, the number of documents requiring a user's attention are displayed in parenthesis.

A user has the ability to define three intelligent folder levels dynamically using available community specific attributes. For example, one user may define a view hierarchy of Account, Document type within the account, and area of Law within the document type. Another user may select Document type, Accounts having that document type, and Client's name related to the document types.

Intelligent folders enable faster archiving and collaboration of documents. A user drags one or more documents into a specific intelligent folder and defines the document's attributes. If a user has defined a set of Document Folder Default Access Control List, the document manager 21 will automatically define Access Control Lists using the template.

A document list is associated with a selected intelligent folder. The document list contains general document attributes such as document name, owner, requested action and its due date. By double clicking a displayed select button a document user is placed in the document detail information screen where the user can perform additional action on the document. Documents requiring user's attention are highlighted.

The user is presented with a document detail view that contains specific general information on the user selected document and a section containing document history, correspondence, and permissible actions against a document. The general information includes:

Document name,

Owner,

Creation date,

Type,

Community specific attributes,

Custom attributes defined by the user,

Default billing account.

The default billing account is generally the owner(s) but a user can optionally select its own, if the user has specified one as part of the account registration process.

Document activities are actions requested or permitted by one user to or from another. These activities are specific to each user and document. A user may have the general permissions to sign documents but unless a document itself has granted signature rights to the user, the user is not allowed to it. Both user signature right and document signature permission for the user must be present for the user to have the authority. All activities against a document are recorded using audit records. A confirmation screen is displayed to the user confirming the action, charge incurred, and the billing account incurring the charge. User confirmation is required to perform the selected action and complete the accounting transaction.

The following are the permissible activities against a document. They are presented as selectable Uls to the user.

Review—A user is allowed to view a document using HTML or other languages, fetch an HTML or comparable version of the document on the user's system 22, or fetch the document in its original format on the user's system 22. Fetching the document is also considered a publication. A specific version of a collaborative document can be accessed through the provided UI.

Approve—User's approval of the document is recorded. It is dependent on the document context and internal communication between the document originator and the user. This activity can be used for internal departmental processing of a given document.

Sign—Selection of this activity digitally signs the document. The signing is performed by:
  sending a document's message digest, hashed encryption of a document using the private key;
  enabling the user to encrypt the message digest using an assigned private key, thus signing the document;
  user sends the signed document as an encrypted message digest, to the document manager 21;
  the document manager 21 verifies the signature by decrypting the signed document, using the user's public key and comparing the public key to the sent message digest;
  the document manager 21 stores the verified signed document and records the action;
  the document manager 21 sends an e-mail to the document owner indicating a signature activity.

The message digest is an encrypted 25 byte hash value generated by proprietary algorithm representing a document.

Reject—Selection of reject rejects the requested activity. The user is required to enter a correspondence as a reason for rejection. Rejection generates an e-mail to the document originator indicating a rejection activity has occurred. An activity rejected by the user will disappear from the user's to-do list and the document list.

Check-out—Selection of check-out allows the user to get a copy of a collaborative document in its original format. A check-out item cannot be checked out again until it is checked-in or canceled.

Check-In—Selection of check-in allows the user to register a new version of the collaborative document. Check-out is a required activity prior to a document check-in. Previous version of a checked-in document is preserved and is accessible by specifying a version during viewing or publishing a document.

Cancel Check-out -Selection of cancel check-out releases a checked out document.

Publish—Selection of publish allows the user the publish the document in various formats.

The document manager 21 provides document access history that is displayed as part of overall document detail viewing. Document access history contains any activity against a document indicating what activity was performed (review, publish original format, sign), the activity's time, and user alias.

Also provided by the document manager 21 is a document correspondence, a related text file that is appended to each document. No information is modified or deleted from document correspondence and no information is written to document correspondence until the user selects an activation (submit) button. Each document correspondence entry is tagged with the time, the user name and the text entry.

Documents are preferably viewable, for most file formats, in an HTML frame. This process converts up to 200 different file formats to a viewable HTML format. Other mark-up languages or formats are also possible. Virus infected files are not viewable though this mechanism.

The document manager 21 also provides a searching and filtering capability. Search criteria is savable for future use. The document manager 21 allows searching against the content of a document as well as the document's attributes. For example, the user searches all documents that have access for a given client as well as containing the words "distributed processing."

All document accesses are granted by the owner of the document. By default no user other than the document owner has any visibility and access to a document unless specifically granted. Additionally, users can only perform an action requested by the owner, and permitted by the user's account against a given document.

The accounting and billing component 100 and the billing and accounting component 66 perform account billing according to the user's billing preferences during document transactions. Each user has one or more billing accounts that are active at the time of a transaction. The activated billing account is debited as a result of a transaction confirmation by the user. Each user selects a billing account as its default account to be used as part of document transaction billing. Each user billing account related to a company has general billing information, such as where the company receives the invoices. Additionally, each user has the opportunity to enter personal credit card information to be used as part of monthly billing for allowing a user to use the same log-on account to receive and archive personal and business oriented documents while separating the billing responsibility.

Each company has the option of customizing the invoice format. Companies are allowed to specify three levels of grouping for each invoice and also to specify the receiving format, such as spreadsheet or paper. Additional detail levels on the invoice are also definable. Invoicing is done on a periodic basis, such as bimonthly, and is accessible on-line. Additional detail for each invoice is accessible for the user.

The community services component 108 provides various UI pages that include relevant business information. A community pages UI provides an area where users post business-oriented information. A general news UI provides links to other major business-related news sites, such as MSNBC and WSJ. Other UI pages with links to business-related areas relevant to a given community or company, such as Schwab.com for the investment community, are also provided. A lending hand area allows for postings generated by businesses needing answers to questions or processes. Other members of the document management system community can choose to answer these postings. A soap box area is a document management system monitored professional white paper and article posting area for use by all members of the community.

Appendix A shows various applications of the present invention.

While the preferred embodiment of the invention has been illustrated and described, it will be appreciated that various changes can be made therein without departing from the spirit and scope of the invention.

What is claimed is:

1. A system for allowing predesignated users at remotely located computer-based systems to perform document management, comprising:
   a public data network;
   a publication facility;
   a remote storage facility; and
   a document manager computer-based system coupled to said publication facility, said remote storage facility and said computer-based systems used by the predesignated users over the public data network, said document manager system comprising:
   local storage; and
   a processor coupled to the local storage, said processor comprising:
      an authentication component for authorizing access to users using said remotely located computer-based systems based on predefined security information;
      an electronic filing document registration component for registering a document and assigning a document process flow to said registered document, wherein said processor allows specific authorized users to perform one or more predefined actions against said registered document based on said assigned document process flow;
      a document archiving component for archiving a registered document at one of said local storage or said remote storage facility;
      a document content indexing component for indexing the content of the designated registered document;
      a searching component for searching the indexed content of registered and archived documents;
      a digital signature component for applying a digital signature to the registered document based on previously supplied digital certificate information and said assigned document process flow;
      an audit trail component for generating audit trail information relative to the registered document, said audit trail information comprises a record of users' accesses of the registered document and user actions performed against the registered document;
      a billing component for generating a bill based on said generated audit trail information of the registered document and predefined fee calculation information; and
      a document publication component for publishing the registered document at said publication facility.

2. The system of claim 1, wherein said registered document is a document type from the group consisting of archive, collaborate, external and template documents.

3. The system of claim 2, wherein archive and template documents are read-only documents.

4. The system of claim 1, wherein the document process flow is defined according to a predefined general process flow.

5. The system of claim 4, wherein the document process flow defines a progression of users with allowed access to the document, the action required by each of the allowed users, the completion date for the action required by each allowed user, and the permissible number of required actions by each user.

6. The system of claim 1, wherein the document process flow is defined according to a predefined company process flow.

7. The system of claim 6, wherein the document process flow defines a progression of users with allowed access to the document, the action required by each of the allowed users, the completion date for the action required by each allowed user, and the permissible number of required actions by each user.

8. The system of claim 1, wherein the document process flow is defined by an authorized user.

9. The system of claim 8, wherein the document process flow defines a progression of users with allowed access to the document, the action required by each of the allowed users, the completion date for the action required by each allowed user, and the permissible number of required actions by each user.

10. The system of claim 1, wherein the predefined actions consist of reviewing, approving, rejecting, digitally signing the document and publishing the document.

11. The system of claim 1, wherein said publication is at least one of a computer disc or a paper publication.

12. The system of claim 1, wherein said processor further comprises a user interface component for generating a user interface with interactive displayed windows viewable by the user at the user's computer-based system, said interactive displayed windows presenting information from the other processor components and comprising interactive features that allow users to perform actions allowed by said processor based on the assigned document process flow.

13. The system of claim 12, wherein said presented information comprises documents with the assigned one or more predefined actions automatically assigned to the user based on the document process flow.

14. The system of claim 12, wherein said interactive features comprises a check-out icon for checking out a document and a check-in icon for checking in a previously checked-out document, wherein said one or more predefined actions are performed on a document when the document is checked-out.

15. The system of claim 12, wherein said interactive features comprises one of one or more subject cabinets and one or more action drawers, each of said subject cabinets comprise registered documents based on a common subject of the documents therein and each of said action drawers comprise registered documents based on a common action to be performed against the documents therein.

16. The system of claim 15, wherein said common subject and common action are assigned by the user.

17. The system of claim 12, wherein said interactive displayed windows comprise a document information window for presenting document information of a user selected document, wherein said document information comprises the selected document's access history, correspondence information, actions performed on the document, document name, owner, creation date, type, attributes and billing account information.

18. The system of claim 17, wherein said presented document information further comprises billing charges relating to said selected document.

19. The system of claim 12, wherein said generated user interface comprises a component for converting a collaborated document to an archive document.

20. The system of claim 1, wherein said digital signature component applies the rights of a notary public to a digital certificate and digital signature by assigning a publicly notarized personal signature to a specific digital certificate.

* * * * *

UNITED STATES PATENT AND TRADEMARK OFFICE
CERTIFICATE OF CORRECTION

PATENT NO. : 6,289,460 B1
DATED : September 11, 2001
INVENTOR(S) : Mir Hajmiragha It is certified that error appears in the above-identified patent and that said Letters Patent is hereby corrected as shown below:

Column 3,
Line 52, "is 30 accessible" should read -- is accessible --

Column 5,
Line 38, "is example" should read -- is an example --

Column 7,
Line 36, "three level" should read -- three levels --

Column 9,
Line 64, "user the publish" should read -- user to publish --

UNITED STATES PATENT AND TRADEMARK OFFICE
CERTIFICATE OF CORRECTION

PATENT NO.    : 6,289,460 B1
DATED         : September 11, 2001
INVENTOR(S)   : Mir Hajmiragha It is certified that error appears in the above-identified patent and that said Letters Patent is hereby corrected as shown below:

Please insert Appendix A

*Appendix A*

Signed and Sealed this

Third Day of September, 2002

Attest:

JAMES E. ROGAN
Attesting Officer    *Director of the United States Patent and Trademark Office*

UNITED STATES PATENT AND TRADEMARK OFFICE
CERTIFICATE OF CORRECTION

PATENT NO. : 6,289,460 C1
APPLICATION NO. : 90/008294
DATED : January 10, 2012
INVENTOR(S) : Mir Hajmiragha Page 1 of 1

It is certified that error appears in the above-identified patent and that said Letters Patent is hereby corrected as shown below:

"The Reexamination Certificate is corrected as follows: Claim 1-19 are cancelled. Claim 20 is confirmed".

Signed and Sealed this
Sixth Day of March, 2012

David J. Kappos
*Director of the United States Patent and Trademark Office*

US 6,289,460 C1

(12) EX PARTE REEXAMINATION CERTIFICATE (8792nd)

United States Patent
Hajmiragha (10) Number: US 6,289,460 C1
(45) Certificate Issued: Jan. 10, 2012

(54) DOCUMENT MANAGEMENT SYSTEM (75) Inventor: Mir Hajmiragha, Bellevue, WA (US)

(73) Assignee: Silicon Valley Bank, Santa Clara, CA (US)

Reexamination Request:
No. 90/008,294, Oct. 23, 2006

Reexamination Certificate for:
Patent No.: 6,289,460
Issued: Sep. 11, 2001
Appl. No.: 09/455,266
Filed: Dec. 6, 1999

Certificate of Correction issued Sep. 3, 2002.

Related U.S. Application Data
(60) Provisional application No. 60/153,583, filed on Sep. 13, 1999.

(51) Int. Cl.
*H04L 9/32* (2006.01)
*G06F 17/30*

(52) U.S. Cl. ............ 726/28; 700/83; 705/53; 707/999.01; 707/E17.008; 726/4

(58) Field of Classification Search .............. None
See application file for complete search history.

(56) References Cited

PUBLICATIONS

To view the complete listing of prior art documents cited during the proceeding for Reexamination Control Number 90/008,294, please refer to the USPTO's public Patent Application Information Retrieval (PAIR) system under the Display References tab.

*Primary Examiner* — Sam Rimell (57) ABSTRACT

A system for allowing predesignated users at remotely located computer-based systems to perform document management. Components of the system include public data network, a publication facility, a remote storage facility and a document manager computer-based system. The document manager computer-based system, the publication facility, the remote storage facility are all coupled to the computer-based systems used by the predesignated users over the public data network. The system allows authorized users from remote locations to perform secure document collaboration, share and archive documents, context index documents, digitally notarize documents, electronically file documents and publish documents.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-20 are cancelled.

\* \* \* \* \*